(12) United States Patent
van der Ham et al.

(10) Patent No.: US 10,371,206 B2
(45) Date of Patent: Aug. 6, 2019

(54) SENSORIZED ROLLER

(71) Applicant: Aktiebolaget SKF, Gothenburg (SE)

(72) Inventors: Andreas Clemens van der Ham, Utrecht (NL); Nicolaas Simon Willem Den Haak, Zwijndrecht (NL); Gerrit-Jan Dop, Alphen aan den Rijn (NL); Feng Qiu, IJsselstein (NL); Jeroen van Diermen, GW Lent (NL)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/628,809

(22) Filed: Jun. 21, 2017

(65) Prior Publication Data
US 2018/0003492 A1 Jan. 4, 2018

(30) Foreign Application Priority Data
Jun. 29, 2016 (DE) .................. 10 2016 211 779

(51) Int. Cl.
*F16C 33/34* (2006.01)
*F16C 19/38* (2006.01)
(Continued)

(52) U.S. Cl.
CPC ............ *F16C 33/34* (2013.01); *F16C 19/361* (2013.01); *F16C 19/386* (2013.01);
(Continued)

(58) Field of Classification Search
CPC .... F16C 19/522; F16C 19/386; F16C 33/366; F16C 41/008; F16C 2233/00; F16C 2360/31; F16C 19/361; F16C 41/002; F16C 2240/12; G01B 21/32; G01L 5/0019;
(Continued)

(56) References Cited

U.S. PATENT DOCUMENTS

| 4,784,004 A | 8/1988 | Ekola |
| 5,111,585 A | 5/1992 | Kawashima et al. |

(Continued)

FOREIGN PATENT DOCUMENTS

| GB | 2128345 A | 4/1984 |
| JP | 2007283524 A | 11/2007 |

(Continued)

*Primary Examiner* — Alan B Waits
(74) *Attorney, Agent, or Firm* — Bryan Peckjian; SKF USA Inc. Patent Dept.

(57) ABSTRACT

The present invention resides in a sensorized roller of a roller bearing. The sensorized roller includes a roller bore that accommodates a measuring device for measuring deformation of the roller bore and electronics for processing a deformation signal from the measuring device and wirelessly transmitting the processed deformation signal to an external receiver. According to the invention, the measuring device and electronics are mounted in a rigid housing that is shaped to fit within the roller bore. A radially outer surface of the housing includes at least one aperture associated with the measuring device. Furthermore, the rigid housing is resiliently mounted to the roller bore via first and second sealing elements that enclose a radial gap between a radially inner surface of the roller bore and a radially outer surface of the housing.

11 Claims, 4 Drawing Sheets

(51) Int. Cl.
  *F16C 41/00* (2006.01)
  *G01B 21/32* (2006.01)
  *G01L 5/00* (2006.01)
  *F16C 33/36* (2006.01)
  *F16C 19/36* (2006.01)
  *G01M 5/00* (2006.01)
  *F16C 19/52* (2006.01)
  *F16C 19/18* (2006.01)

(52) U.S. Cl.
  CPC .......... *F16C 19/522* (2013.01); *F16C 33/366* (2013.01); *F16C 41/00* (2013.01); *F16C 41/002* (2013.01); *F16C 41/008* (2013.01); *G01B 21/32* (2013.01); *G01L 5/0019* (2013.01); *G01L 5/0028* (2013.01); *G01M 5/0041* (2013.01); *F16C 19/184* (2013.01); *F16C 2233/00* (2013.01); *F16C 2240/12* (2013.01); *F16C 2240/18* (2013.01); *F16C 2360/31* (2013.01)

(58) Field of Classification Search
  CPC ... G01L 5/0028; G01L 5/0041; G01M 5/0041
  See application file for complete search history.

(56) References Cited

U.S. PATENT DOCUMENTS

| | | | | |
|---|---|---|---|---|
| 5,181,423 A | * | 1/1993 | Philipps | G01D 5/2417 340/448 |
| 5,503,030 A | * | 4/1996 | Bankestrom | F16C 19/522 73/862.49 |
| 5,591,921 A | | 1/1997 | Schaede | |
| 7,196,277 B1 | | 3/2007 | Santi | |
| 7,698,963 B2 | | 4/2010 | Herhaus | |
| 8,376,622 B2 | * | 2/2013 | Claus | F16C 19/52 320/108 |
| 8,961,021 B2 | * | 2/2015 | Stubenrauch | F16C 41/008 384/448 |
| 9,127,649 B2 | * | 9/2015 | Matsuda | F16C 41/008 |
| 2008/0115590 A1 | | 5/2008 | Loenner et al. | |
| 2011/0002572 A1 | * | 1/2011 | Miyachi | F16C 33/526 384/574 |
| 2011/0155539 A1 | | 6/2011 | Schmidt et al. | |
| 2011/0182536 A1 | * | 7/2011 | Matsuda | F16C 19/522 384/448 |
| 2012/0020603 A1 | * | 1/2012 | Stubenrauch | F16C 41/008 384/448 |
| 2013/0048443 A1 | | 2/2013 | Muramatsu et al. | |
| 2014/0157880 A1 | * | 6/2014 | Matsuda | F16C 41/008 73/112.01 |
| 2014/0353127 A1 | | 12/2014 | Hearn | |
| 2018/0003492 A1 | | 1/2018 | Van Der Ham et al. | |

FOREIGN PATENT DOCUMENTS

| | | |
|---|---|---|
| KR | 20030086943 A | 11/2003 |
| WO | 2011111550 A1 | 9/2011 |
| WO | 2015032445 A1 | 3/2015 |
| WO | 2015032449 A1 | 3/2015 |

* cited by examiner

SENSORIZED ROLLER

CROSS REFERENCE TO RELATED APPLICATIONS

This application claims priority to German patent application no. 102016211779.3 filed on Jun. 29, 2016, the contents of which are fully incorporated herein by reference.

FIELD OF THE INVENTION

The present invention relates to the field of load detection in roller bearings and is more particularly directed to a bearing roller with a hollow bore in which one or more sensors are provided for measuring deformation of the roller bore.

BACKGROUND OF THE INVENTION

An example of a bearing roller of this kind is known from U.S. Pat. No. 9,127,649. The roller is equipped with a sensor that detects a physical state of the bearing roller, which sensor is attached to an inner surface of the roller bore, which defines a cavity. A signal from the sensor is received by a processing portion, which processes and transmits the detection signal to a receiver outside of the bearing. The processing portion is provided on a substrate accommodated within the bore cavity, whereby a substrate retaining material is interposed between the sensor and the substrate. The retaining material may be an elastomeric material that is poured into the bore cavity in liquid state and then cured.

Due to a "chewing motion" inside the roller bore, there is a risk that the elastomer material will become detached from the inner surface of the bore and that this will cause strain on, if not rupture of, the electrical connections between the sensor element and processing electronics. A method to fixate the electronics with respect to the bore is disclosed in DE102012200779.

There is still room for improvement.

BRIEF SUMMARY OF THE INVENTION

The present invention resides in a sensorized roller of a roller bearing, the sensorized roller comprising a roller bore which accommodates a measuring device for measuring deformation of the roller bore and electronics for processing a deformation signal from the measuring device and wirelessly transmitting the processed deformation signal to an external receiver. According to the invention, the measuring device and processing electronics are mounted in a rigid housing that is shaped to fit within the roller bore, whereby a radially outer surface of the housing comprises at least one aperture associated with the measuring device. Furthermore, the rigid housing is resiliently mounted to the roller bore via first and second sealing elements that enclose a radial gap between a radially inner surface of the roller bore and a radially outer surface of the housing.

The measuring device and electronics are thus protected against contaminants such as lubricant and moisture by the housing and by the first and second sealing elements that seal the bore at both axial ends. Friction between the sealing elements and the bore surface also limits rotation of the housing within the bore. Furthermore, the resilient first and second sealing elements take up deformations of the roller bore, to prevent the housing from coming into contact with the bore. The housing is made from a rigid material such as plastic which is sufficiently stiff in radial direction to prevent contact between the bore and the housing along the full axial length of the housing.

The housing, measuring device and electronics form a sensor unit that can be easily mounted to and dismounted from the roller bore. The electronics of the sensor unit comprise at least a processor and an antenna. Preferably, the sensor unit housing is fully contained within exterior dimensions of the roller.

In a preferred embodiment, the sensor unit is configured such that the components housed therein can be replaced or serviced. The housing may comprise two semi-cylindrical housing portions which are joined by means of first and second end caps that fit over first and second axial ends of the two housing portions. In one example, the first and second axial ends of the housing portions are provided with an external thread and the first and second end caps are provided with a cooperating internal thread. To prevent unscrewing, each end cap may be provided with a retaining lip that engages with a corresponding notch in the housing body. Alternatively, the housing body may be provided with a lip that engages in a notch provided in the end cap.

The housing of the sensor unit enables the measuring device to be accurately located within the roller bore. The housing also locates the electronics of the sensor unit, which is especially important with regard to the antenna for transmitting the processed deformation signal. Suitably, the antenna is located as close as possible to an axially outer end of the roller, to facilitate transmission of the signal.

In a preferred example, the antenna is encased within a hollow chamber of the housing, which is free from potting compound. The present inventors have found that the use of potting compound adversely affects the transmissibility of the signal.

The housing of the sensor unit may be accurately located within the roller bore by means of the first and second sealing elements. In an embodiment, each sealing element is mounted between a stepped portion of the roller bore and a recess in the radially outer surface of the housing. The recess may be provided in the endcaps.

The sensor unit housing in a sensorized roller of the invention may be used to mount and locate any kind of measuring device that can measure deformation of the bore. In some examples, the measuring device comprises a non-contact proximity sensor for measuring radial distance to the radially inner surface of the roller bore, whereby the radially outer surface of the housing comprises a corresponding aperture. The proximity sensor may be a capacitive sensor, an inductive sensor or an eddy current probe. Preferably, to improve accuracy, the measuring device comprises two proximity sensors arranged at diametrically opposite sides of the bore. This enables the radial dimension of the bore itself to be measured.

In an alternative example, the measuring device comprises one or more cantilever beams that extend in an axial direction of the roller, whereby a contact element is provided on each cantilever beam, which contact element extends through an aperture in the radially outer surface of the housing and bears against the radially inner surface of the roller bore. At least one sensor is provided on each cantilever beam for measuring bending thereof, due to deflection of the beam in a radial direction perpendicular to the axial direction. Preferably, a measuring device of this kind comprises two cantilever beams with contacts elements that bear against the roller bore surface at diametrically opposite locations.

In a further development, each cantilever beam comprises a first section that extends in axial direction away from a fixed end of the beam and further comprises a second section that extends in axial direction back towards the fixed end. The contact elements are located at the second section. Such a configuration prevents axial movement of the contact elements relative to the bore, which could affect measurement accuracy.

In some embodiments, a sensorized roller according to the invention comprises two or more axially spaced measuring devices. This enables a load distribution along the roller to be determined.

The invention will now be described in further detail with reference to the accompanying drawings.

DETAILED DESCRIPTION OF THE INVENTION

Figure 1:
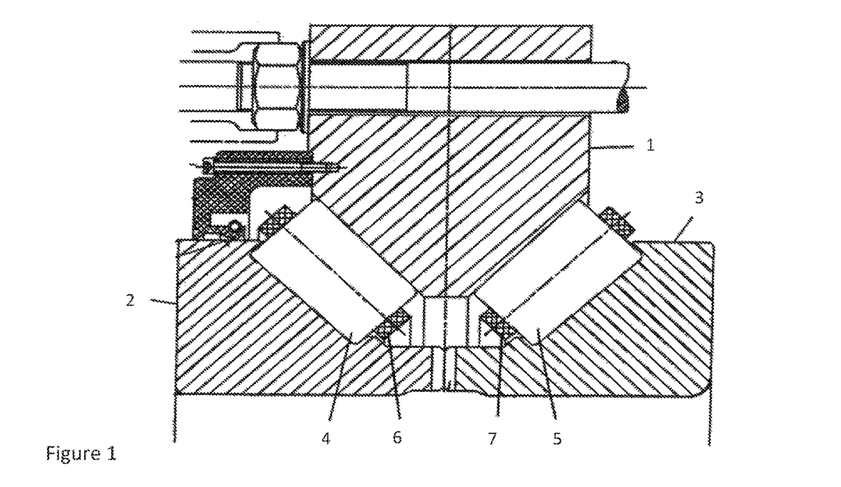
FIG. 1 shows a part cross-sectional view of a roller bearing that may be equipped with a roller according to the invention.

An example of a bearing that is suitable for supporting the main shaft of a wind turbine is shown in FIG. 1. The bearing must withstand high axial loads as well as radial loads and is executed as a double-row tapered roller bearing. The bearing comprises an outer ring 1 provided with conically shaped first and second outer raceways for a first set 4 and a second set 5 of tapered rollers. The bearing further comprises first and second inner rings 2, 3 which are respectively provided with conically shaped first and second inner raceways for the first and second roller sets 4, 5. In addition, a first cage 6 and a second cage 7 are provided for retaining the rollers of the first and second roller sets respectively. Typically, the cages are formed from segments that abut each other in circumferential direction.

To provide the necessary stiffness and ensure a long service life, the bearing is preloaded. The axial position of the inner rings 2, 3 relative to the outer ring 1 is set such that the first and second roller sets 4, 5 have a negative internal clearance. The first and second inner rings are then bolted together or otherwise axially clamped to maintain the preload over the lifetime of the bearing. In practice, however, preload gradually decreases over time. If preload is lost and the radial load on a roller becomes zero, it will be able to move towards a small-diameter side of the radial gap between the inner and outer raceways, possibly leading to an excessive load that will reduce the service life of the bearing. Since a main shaft bearing is a critical and expensive component of a wind turbine, it is important to detect if the bearing loses preload. It is also beneficial to be able to measure the radial load acting on the bearing and to characterize the angular extent of the bearing's loaded zone. One way of doing this is to measure the radial load acting on an individual roller. In the depicted bearing, at least one of the solid tapered rollers in either of the first and second roller sets 4, 5 is replaced with a sensorized roller.

Figure 2A:
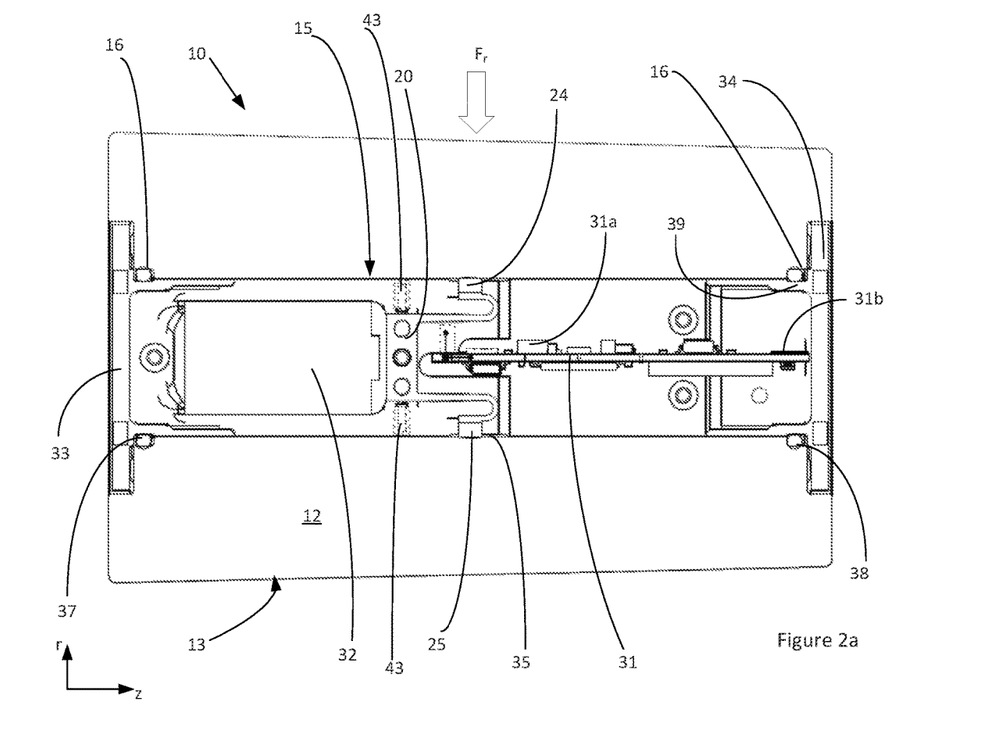
FIG. 2a shows a cross-section of an example of a sensorized roller according to the invention comprising a sensor unit mounted in a hollow bore of the roller.
Figure 2B:
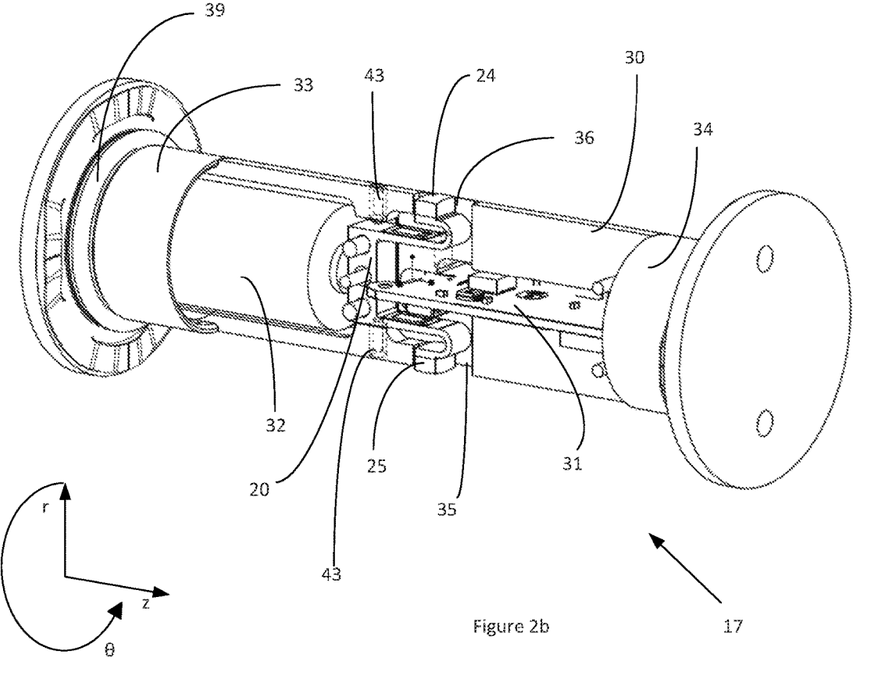
FIG. 2b shows a perspective view of the sensor unit used in the roller of FIG. 2, with part of a housing component removed.

A radial cross-section of an example of a sensorized roller according to the invention is shown in FIG. 2a. The roller 10 has a roller body 12 whose radially outer surface 13 is in contact with the inner and outer raceways of the bearing. The roller is provided with a hollow bore 15, which has a cylindrical bore surface in the depicted example. A sensor unit is accommodated in the bore, which is adapted for measuring deformation of the roller bore 15 due to radial load Fr on the roller 10. A perspective view of the sensor unit 17 is shown in FIG. 2b, whereby some sections have been removed to reveal the underlying components.

The sensor unit comprises a measuring device 20 for measuring deformation of the roller bore and further comprises a PCB 31, which has a processor 31a that receives and processes the deformation signal from the measuring device 20 and an antenna 31b for transmitting the processed signal to a receiver outside of the bearing.

According to the invention, the measuring device 20, the processor 31a and the antenna 31b are mounted in a housing made of rigid material, which housing is shaped to fit inside the roller bore with a slight radial clearance. The housing 30 is resiliently mounted to the roller bore 15 via first and second sealing elements 37, 38 which enclose a radial gap between a radially inner surface of the bore and a radially outer surface of the housing 30. O-rings are used in the depicted example.

Suitably, the housing 30 and the roller bore 15 are complementarily shaped such that the sensor unit 17 is fully contained within the length of the roller 10 in axial direction z and is precisely located within the roller bore. The housing 30 thus enables precise positioning of the measuring device 20 and allows the antenna 31a to be placed close to an axially outer end of the bore, to improve transmissibility of the processed signal from the measuring device 20.

The measuring device 20 in the depicted example is a bending beam device comprising first and second cantilever beams. Free ends of the first and second cantilever beams are provided with respective first and second contact elements 24, 25, which bear against the radially inner surface of the roller bore 15. Changes in the radial dimension of the bore cause deflections of the cantilever beams, the bending strain of which is measured in order to determine deformation of the bore. At the locations where the first and second contact elements 24, 25 bear against the bore surface, the housing comprises corresponding apertures 35 through which the contact elements protrude. The measuring device 20 and the electronics of the PCB 31 are therefore protected from contaminants such as lubricant and moisture by the housing itself and by the first and second sealing elements 37, 38 that seal off the roller bore 15.

Furthermore, the first and second sealing elements 37, 38, which may be made from an elastomeric material such as NBR, are compliant. These elements take up deformations of the roller bore 15, thereby preventing the housing 30 from making contact with the bore. The housing may be made from a plastic material, and is sufficiently stiff in radial direction to ensure that the outer surface of the housing 30 does not come into contact with the bore 15 along its full length.

Advantageously, the sensor unit 17 is configured such that components housed within the unit can be replaced or serviced. Preferably, the housing 30 is formed from two halves which are connected together after the various components of the sensor unit 17 are mounted to one housing half. The unit may further comprise a power source 32, which is a battery in the depicted example. In other examples, the sensor unit is provided with power harvesting means.

The housing halves may be connected together by means of first and second end caps 33, 34. In the depicted example, a threaded portion is provided on an outer surface of each housing half, at both axial ends of the housing 30, which match together to form an external thread. An internal thread is provided on the first and second end caps 33, 34 which are screwed onto the housing halves to join these together. Each endcap 33, 34 may be provided with a retaining lip which engages in a corresponding notch in each housing half, to prevent unscrewing of the endcaps. Needless to say, other ways of joining the housing halves may be applied.

At either axial end of the roller bore 15, the bore surface suitably comprises a stepped portion 16, such that the bore has a larger diameter at the stepped portions 16 than at a main section of the bore where the contact elements 24, 25 of the measuring device 20 bear against the bore surface. Similarly, the first and second end caps 33, 34 comprise a recessed portion 39, such that the recessed portions 39 have a smaller outside diameter than a main outside diameter of the housing 30. The first and second O-rings 37, 38 are respectively arranged between the recessed portion 39 in the first and second end caps 34, 35 and the stepped portion 16 at either axial end of the roller bore. This enables the sensor unit 17 to be accurately located within the roller bore and ensures effective sealing.

Figure 3:
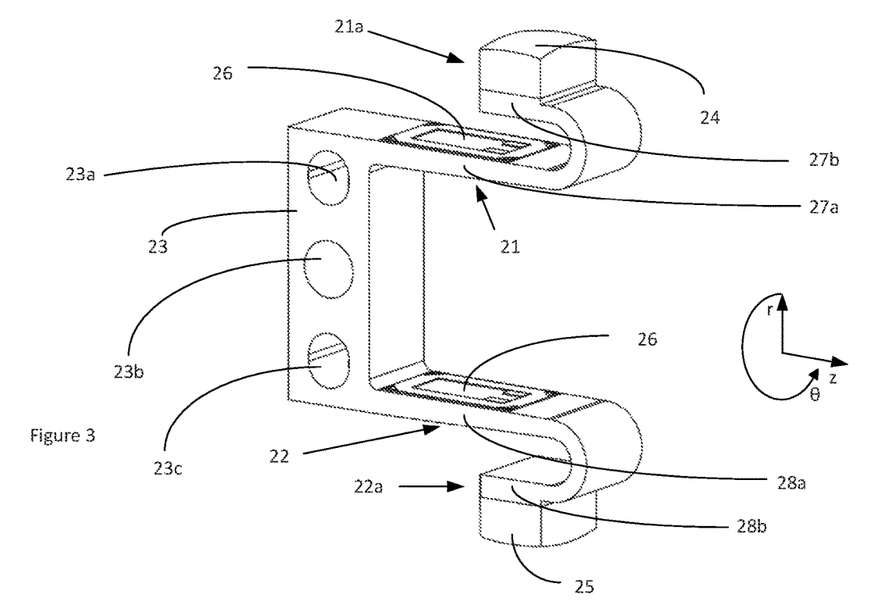
FIG. 3 shows a perspective view of a measuring device used in the sensor unit from FIGS. 2a and 2b.

The measuring device 20 is shown in greater detail in FIG. 3. The first and second cantilever beams 21, 22 have respective free ends 21a, 22a and fixed ends that are connected to a rigid mounting portion 23. At least one sensor 26 is provided on each cantilever beam 21, 22 for measuring bending due to deflection of the beam in a radial direction perpendicular to the axial direction. The mounting portion 23 serves to fix the device to the sensor unit housing 30, via mounting holes 23a, 23b, 23c and e.g. bolts. Preferably, the position of the measuring device 20 is adjustable in radial direction r. Referring to FIGS. 2a and 2b, the housing 30 may comprise recesses 43 which extend in the radial direction and accommodate adjustment elements that can be e.g. screwed against surfaces of the mounting portion 23 that are normal to the radial direction. Furthermore, the mounting holes may have an oval shape, such as holes 23a and 23c or may have a larger diameter than that of the bolt shanks, to enable displacement in radial direction.

The first contact element 24 is provided at the free end 21a of the first cantilever beam and the second contact element 25 is provided at the free end 22a of the second cantilever beam. The first contact element 24 bears against the bore surface at a first location and the second contact element bears against the bore surface at a second location, diametrically opposite from the first location. Preferably, the contact elements 24, 25 have a spherical or convex surface that is curved in circumferential direction 8, to conform with the cylindrical bore surface. Advantageously, the contact surface of the contact elements 24, 25 is also curved in axial direction z, and may have a dome-shaped contact surface resembling a slice through a peripheral region of a sphere.

When radial load Fr acts on the roller 10, the circular cross-section of the roller bore 15 deforms to an elliptical shape, resulting in a change of bore diameter which in turn causes a deflection of the first and second cantilever beams 21, 22 in radial direction r. Thus, by measuring the bending of these beams, it is possible to detect variations in the radial load acting on the roller 10.

In a further development, the cantilever beams of the measuring device 20 are provided with a geometry that reduces axial displacement of the contact elements relative to the bore surface as a result of beam deflection in radial direction. Specifically, the first cantilever beam 21 has a first section 27a that extends in axial direction away from the mounting portion 23 and a second section 27b that extends back towards the mounting portion in opposite axial direction, whereby the first contact element 24 is provided on the second section 27b. Similarly, the second cantilever beam 22 has a first section 28a that extends away from the mounting portion 23 and a second section 28b that extends back towards the mounting portion, whereby the second contact element 25 is provided on the second longitudinal section 28b. The respective first and second sections are joined by a bend, such the load cell has a fish-hook shape in the depicted example. Deflection of the second section 27b, 28b in radial direction interacts with the deflection of the respective first section 27a, 27b to reduce the axial displacement of the respective contact element 24, 25 relative to the bore surface 15. The stiffness of the second section 27b, 28b is suitably adjusted relative to the stiffness of the respective first section 27a, 28a to achieve this effect. Furthermore, due to the curvature of the surface of the contact elements 24, 25 in axial direction z, the axial displacement causes a rolling/tilting motion of the contact element on the bore surface. Thus sliding contact in axial direction z can be eliminated.

The sensor unit 17 is not fixed to the roller bore 15. It is therefore possible for relative rotation in circumferential direction 8 to occur. Such a motion is referred to as creep, and is expected to be significantly slower than the rotational speed of the roller 10. As a result, there will be a negligible effect on differential measurements of the radial distance between the contact elements 24, 25. Friction between the first and second sealing elements 37, 38 and the surfaces which they contact prevents significant relative rotation of the sensor unit 17 and of the contact elements 24, 25.

Figure 4:
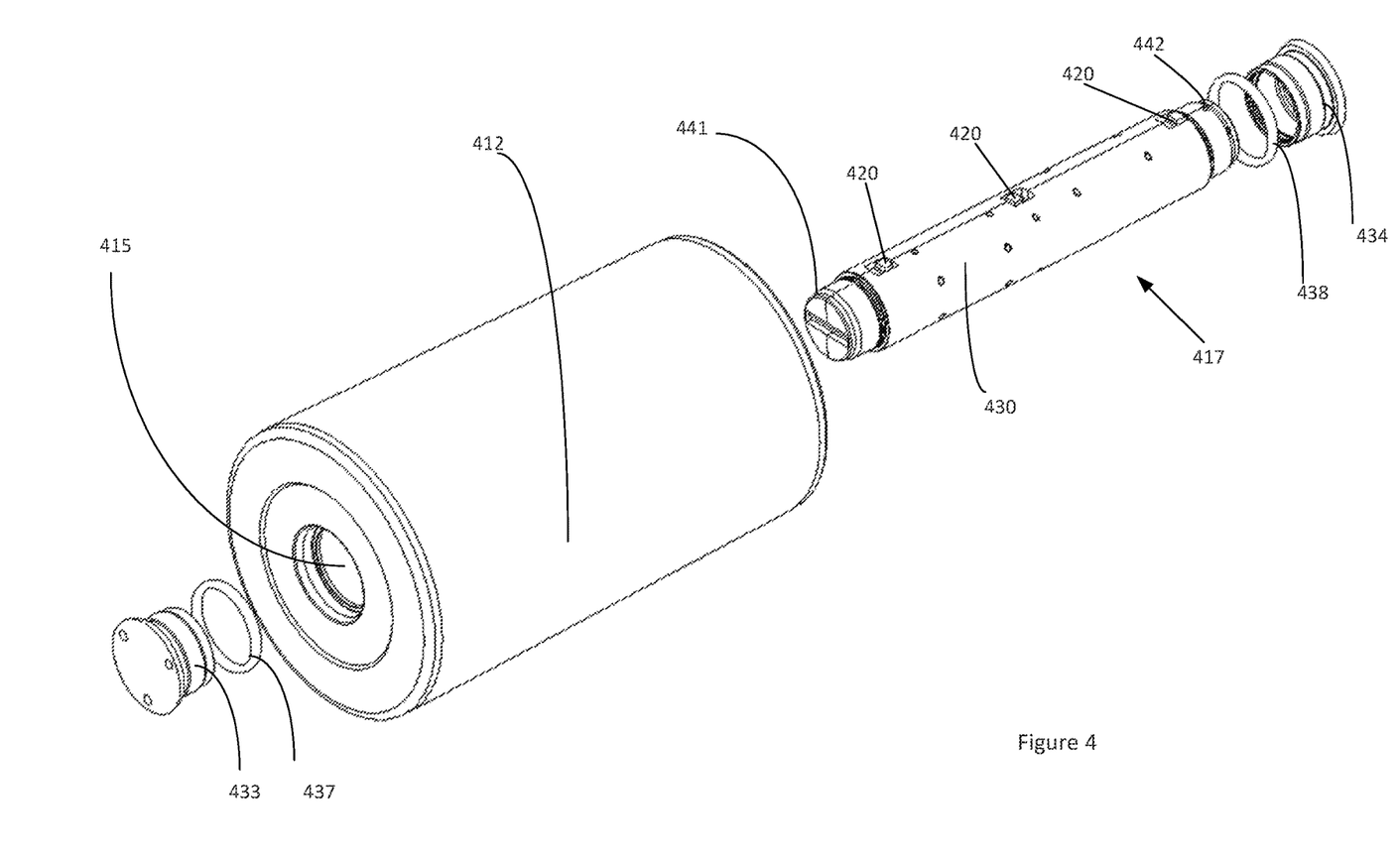
FIG. 4 shows a perspective view of a further example of a sensorized roller according to the invention, prior to insertion of the sensor unit.

In a further embodiment of the invention, the sensorized roller is equipped with two or more axially spaced measuring devices. Components of an example of such a roller 400 are shown in perspective view in FIG. 4, prior to insertion of the sensor unit 417 within a central bore 415 that extends through the roller body 412. Like the embodiment of FIGS. 2a and 2b, the sensor unit 417 comprises a housing 430 formed from two semi-cylindrical housing halves which are fixed together by means of first and second end caps 433, 434 that screw onto corresponding first and second threaded portions 441, 442 at opposite axial ends of the housing. The sensor unit housing as a whole is shaped to fit within the roller bore 415, and is mounted to and located in the bore 15 by means of first and second sealing elements 437, 438. In this embodiment, three measuring devices 420 of the kind shown in FIG. 3 are mounted in the housing, for measuring deformation of the roller bore 415 at three axially spaced locations. This enables a load distribution across the roller to be determined. The electronics of the sensor unit 417, including the processor that receives and processes the signal from each measurement device 420, are also located within the housing.

In other embodiments, the sensor unit is equipped with one or measuring devices adapted for contact-free measurement of the radial deformation of the roller bore. Inductive or capacitive proximity sensors may be used. In the example shown in FIG. 5, the sensor unit is provided with three sets of axially spaced eddy current probes. Each set comprises a first eddy current probe 520a and a second eddy current probe 520b, arranged opposite from the corresponding first probe, enabling measurement of the bore diameter at that axial location. In accordance with the invention, each eddy current probe and electronics of the sensor unit (including a processor 531a and an antenna 531b) are mounted within a rigid housing that is shaped to fit within a central bore through the roller body 512. The housing is resiliently mounted to and located in the roller bore via first and second sealing elements 537, 538.

Figure 5:
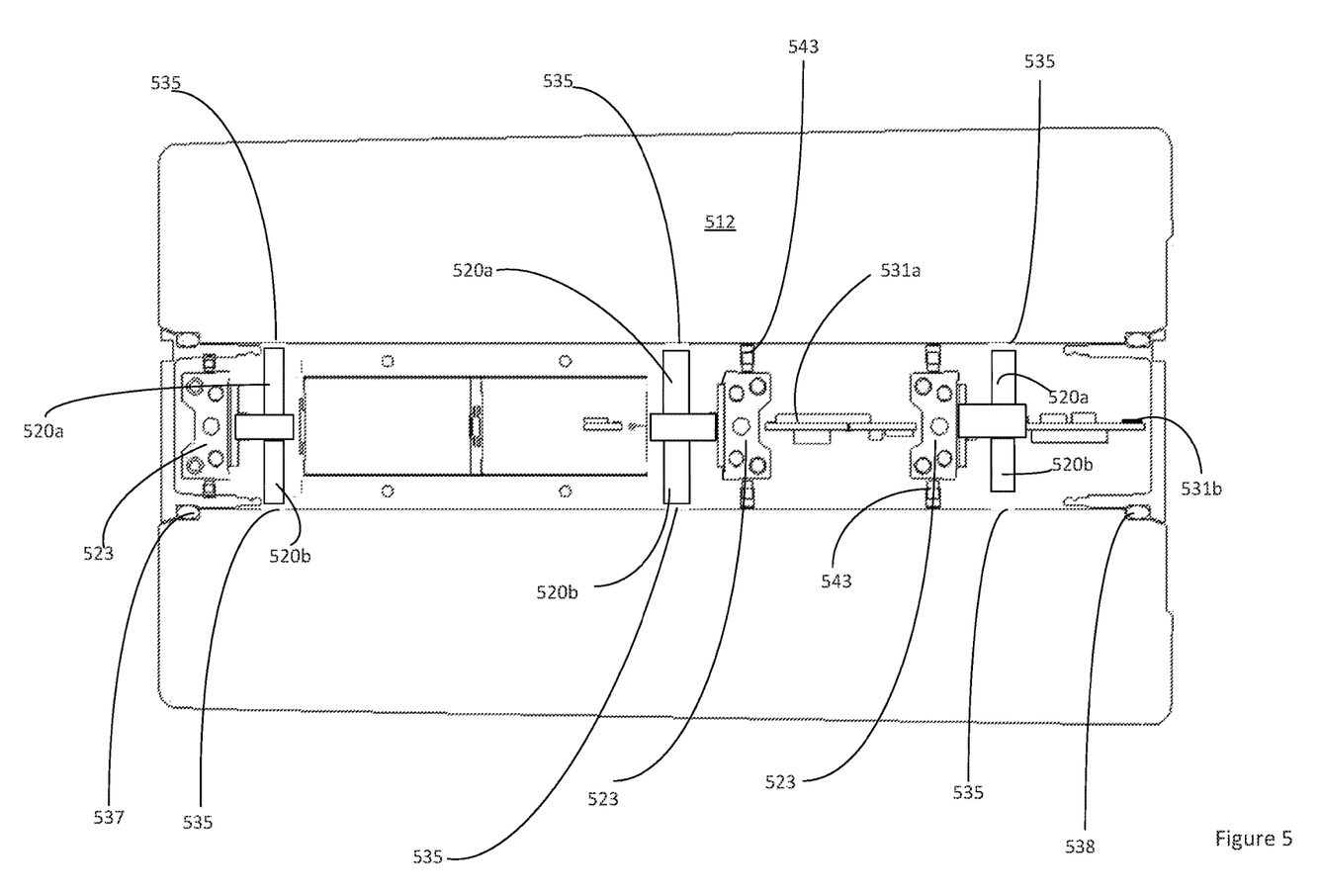
FIG. 5 shows a cross-section of a still further example of a sensorized roller according to the invention.

Each set of eddy current probes 520a, 520b is supported on a platform that is secured to the housing via holes provided in a mounting portion 523. Corresponding fixation elements such as screws (not shown) do not make contact with the roller bore. Suitably, the housing is provided with adjustment means 543 for enabling the position of each mounting portion 523 to be adjusted in radial direction. The adjustment means 543 may comprises a threaded recess, which extends in radial direction, for receiving screws that bear against the mounting portion. The holes in each mounting portion 543 may have a diameter that is larger than that of the fixation elements, to enable adjustment in radial direction. At the location of a head of each eddy current probe 520a, 520b, the radially outer surface of the housing has an aperture 535, to enable measurement of the radial gap to the inner surface of the roller bore.

A number of aspects and embodiments of the invention have been described. The invention is not restricted to these embodiments, but may be varied within the scope of the accompanying claims.

The invention claimed is:

1. A sensorized roller for a bearing comprising:
   a roller bore that extends through the roller about an axis thereof and accommodates;
   a measuring device for measuring deformation of the roller bore;
   a processor for receiving a deformation signal from the measuring device; and
   an antenna for wireless transmission of the processed deformation signal to an external receiver, wherein
   the measuring device, the processor and the antenna are mounted in a rigid housing that is shaped to fit within the roller bore, wherein
   the rigid housing is resiliently mounted to the roller bore via first and second sealing elements that enclose a radial gap between a radially inner surface of the roller bore and a radially outer surface of the housing, and wherein
   the antenna is enclosed within a hollow chamber of the housing.

2. The sensorized roller according to claim 1, wherein the housing is fully contained within exterior dimensions of the roller.

3. The sensorized roller according to claim 1, wherein the housing comprises two semi-cylindrical housing portions that are joined by first and second end caps that fit over first and second axial ends of the two housing portions.

4. The sensorized roller according to claim 3, wherein the first and second axial ends of the housing portions are provided with an external thread and the first and second end caps are provided with a cooperating internal thread.

5. The sensorized roller according to claim 4, wherein at least one of the first and second endcaps is provided with one of a retaining lip and a retaining recess that engages with the other of a retaining recess and a retaining lip provided in the housing portions, for preventing unscrewing of the endcap.

6. The sensorized roller according to claim 1, wherein the measuring device comprises one or more cantilever beams that extend in an axial direction (z) of the roller, wherein a contact element is provided on each cantilever beam that extends through an aperture in the radially outer surface of the housing and bears against the radially inner surface of the roller bore, and wherein at least one sensor is provided on each cantilever beam for measuring bending thereof, due to deflection of the beam in a radial direction (r) perpendicular to the axial direction (z).

7. The sensorized roller according to claim 6, wherein each cantilever beam comprises a first section that extends in axial direction (z) away from a fixed end of the beam and further comprises a second section that extends in axial direction back towards the fixed end.

8. The sensorized roller according to claim 1, wherein the housing comprises adjustment means that engages with a mounting portion associated with the measuring device and enables adjustment of the position of the measuring device in radial direction (r).

9. The sensorized roller according to claim 1, further comprising two or more axially spaced measuring devices for measuring deformation of the roller bore at axially spaced locations.

10. A bearing comprising:
    a roller having;
    a roller bore that extends through the roller about an axis thereof and accommodates;
    a measuring device for measuring deformation of the roller bore;
    a processor for receiving a deformation signal from the measuring device; and
    an antenna for wireless transmission of the processed deformation signal to an external receiver, wherein
    the measuring device, the processor and the antenna are mounted in a rigid housing that is shaped to fit within the roller bore, wherein
    the rigid housing is resiliently mounted to the roller bore via first and second sealing elements that enclose a radial gap between a radially inner surface of the roller bore and a radially outer surface of the housing, and wherein
    each sealing element is mounted between a stepped portion of the roller bore and a recess in the radially outer surface of the housing.

11. A sensorized roller for a bearing comprising:
    a roller bore that extends through the roller about an axis thereof and accommodates;
    a measuring device for measuring deformation of the roller bore;
    a processor for receiving a deformation signal from the measuring device; and
    an antenna for wireless transmission of the processed deformation signal to an external receiver, wherein
    the measuring device, the processor and the antenna are mounted in a rigid housing that is shaped to fit within the roller bore, wherein
    the rigid housing is resiliently mounted to the roller bore via first and second sealing elements that enclose a radial gap between a radially inner surface of the roller bore and a radially outer surface of the housing, and wherein
    the measuring device comprises a non-contact proximity sensor that measures a radial distance to the radially inner surface of the roller bore and wherein the radially outer surface of the housing comprises a corresponding aperture.

* * * * *